Figure 1:
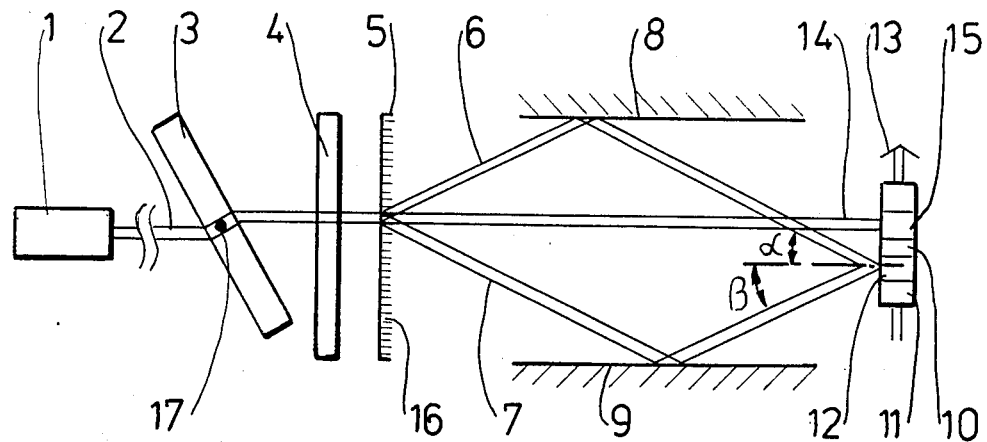

United States Patent [19]

Süse et al.

[11] Patent Number: 4,696,009

[45] Date of Patent: Sep. 22, 1987

[54] METHOD AND ARRANGEMENT FOR PRODUCING ULTRASHORT LIGHT PULSES

[76] Inventors: Karl-Ernst Süse, 1, Hermann-Matern-Strasse, 6902 Jena-Lobeda; Frank Weidner, 6901 Löbschütz, No. 20b, District of Gera, German Democratic Rep.

[21] Appl. No.: 806,890

[22] Filed: Nov. 25, 1985

[30] Foreign Application Priority Data

Dec. 27, 1984 [DD] German Democratic Rep. .................................... 2718100

[51] Int. Cl.⁴ ............................................. H01S 3/10
[52] U.S. Cl. ........................................ 372/25; 372/20; 372/96; 372/102
[58] Field of Search ..................... 372/25, 10, 53, 102, 372/96, 20

[56] References Cited

U.S. PATENT DOCUMENTS 4,479,220 10/1984 Bor et al. ............................... 372/25

FOREIGN PATENT DOCUMENTS 2900728 7/1980 Fed. Rep. of Germany .

Primary Examiner—James W. Davie
Assistant Examiner—Bertha Randolph

[57] ABSTRACT

A method and arrangement for producing ultrashort light pulses of tunable wavelength and pulse duration for use in spectroscopy, photobiology and in the medical science comprises a pumping radiation source for producing a substantially coherent radiation. A grating is provided for producing a first and a second partial beam from the coherent radiation which are superimposed in a laser active medium operating to the distributed feedback principle, for generating a laser beam in a first range of the laser active medium. According to the invention a third partial beam is produced at said grating. The third partial beam is fed into the laser active medium into a second range of the same which is either entirely or partially or not at all overlapping said first range. The second range is passed by the laser beam. A tiltable planoparallel plate is inserted into the coherent radiation for displacing the first and second partial beam relative to the third partial beam and, hence, the first and second range. Furthermore, an arrangement is provided to vary the energies in the first and second partial beam relative to that in the third partial beam.

11 Claims, 2 Drawing Figures

METHOD AND ARRANGEMENT FOR PRODUCING ULTRASHORT LIGHT PULSES

BACKGROUND OF THE INVENTION

The invention relates to an arrangement for producing ultrashort light pulses of tunable wavelength and pulse duration, particularly fo use in the spectroscopy, photobiology and in the medical science.

In addition to conventional lasers with resonator reflectors lasers with distributed feedback (DFBL) are of growing importance in the field of art. It is known to produce with DFBL single laser pulses of a few pico-sec. duration even when pumped with comparatively long pumping pulses of a few nano-seconds. In this case the pumping energy may transgress the threshold energy of the DFB laser by not more than 20%, as disclosed in the DE-OS No. 29900728. This precludes the generation of intensive short single pulses. A way-out is the use of DFBL with subsequent amplifier stages which, however, considerably increases the technical expenditures. A variation of the pulse duration of the pulses produced in this manner is only feasible to a certain degree over the entire pumping pulse width.

In order to generate feedback in a DFBL the modulation of the refractive index or of the gain factor in the laser active medium is necessary.

The latter is generally obtained by interference of two partial beams produced by a pumping laser.

The reflectors used as beam splitters exhibit the following disadvantages:

A low spatial and time coherence of the pumping radiation proves to be a direct disadvantage for the visibility of the interference pattern to be produced.

The known beam splitting layers do not ensure a polarization independent beam splitting. The visibility of the gain modulation is reduced.

The beam splitting layers cause remarkable intensity losses in particular in the uv-range of radiation which is of importance in excitation of DFBL. Such losses are disadvantageous for the energy and the halfwidth of the generated DFBL pulses.

It is known from the DE-OS No. 2900728 to use a holographic grating as a beam splitter for DFBLs, the required feedback in the DFBL being generated by interference of the partial beams of the $\pm 1^{st}$ order originating from the grating.

This solution is disadvantageous since the limitation of the pumping energy also limits the energy of the laser pulses produced.

SUMMARY OF THE INVENTION

It is an object of the present invention to obviate the above disadvantages.

It is a further object of the present invention to provide an arrangement and method which permit the full exploitation of the pumping energy at a low technical expenditure and to obtain a considerable energy increase with ultrashort light pulses of tunable wavelengths and pulse duration.

It is still a further object of the present invention to provide an arrangement and method which permit, even when the pumping energy is raised far above the threshold of the laser active medium, the production of ultrashort light pulses of tunable wavelength and of adjustable pulse duration even when the pumping pulse width is maintained constant. In accordance with the present invention a method is provided for producing ultrashort light pulses in which two partial bundles of a substantially coherent bundle of radiation are fed in superimposition into a laser active medium for generating an interference pattern, characterized in that in addition to the first two partial bundles a third partial bundle derived from the bundle of radiation is fed into the laser active medium for varying the density of the photon flux of the pumping radiation in the lasing range. Said third partial bundle is either fed in directly into the lasing range or into a range of the laser active medium which the laser pulses generated in the lasing range pass through. By displacement of the lasing range relative to the range into which the third partial bundle enters and/or by variation of the relation of the energies in the first two partial bundles relative to the third partial bundle the density of the photon flux of the pumping radiation in the laser active medium and, hence, in the lasing range is varied.

A further object of the invention is to provide a device for generating ultrashort light pulses in which in the bundle of radiation from a substantially coherent pumping radiation source means for focusing and generating two coherent partial bundles are subsequently arranged. A deviating unit is associated with each partial bundle for superimposing both partial bundles and for interference pattern formation in a laser active medium. Said two partial bundles impinge upon the laser active medium in a first lasing range. In addition to said two partial bundles a third partial bundle is directed upon a second range of the laser active medium substantially adjacent the first range, in which laser pulses are generated which pass said second range. Means are provided both for displacing the first and the second range relative to one another. Furthermore means are provided for control of the energy in the first partial bundles relative to the energy in the third partial bundle.

While the two first orders of a transmission or reflection grating are used for the first two partial bundles the third partial bundle represents the zero order. For control of the energy of the first two partial bundles relative to the third partial bundle, the grating has a variable contrast in parallel to its grating line direction and is displaceable in direction of the lines relative to the bundle of radiation of the pumping radiation source.

Advantageously, for displacing the two ranges relative to one another, a tiltable plano-parallel plate is arranged between the pumping radiation source and the focusing means, the axis of tilt being parallel to the direction of the grating lines. Alternatively, the means for focusing, the grating, the deviating units and the laser active medium are secured to a common mount which is displaceable in a direction at right angles to the direction of propagation of the radiation bundle from the pumping radiation source and at right angles to the direction of the grating lines. It is also feasible, only to secure the deviating units and the laser active medium to said common unit.

By interference of the two first partial bundles a modulation of the gain factor is obtained in the laser active medium so that a DFB laser is formed. Investigations have shown that the energy, the halfwidth and the shape of the DFBL pulses is primarily determined by the density of the photon flux of the pumping radiation.

When in the range of the distributed feedback the density of the photon flux is comparatively high over the entire period of the pumping pulse then comparatively long and structurized pulses result. When, however, the density of the photon flux is only sufficiently high in the range of the maximal intensity of the pumping pulse then comparatively short pulses in dependence on the properties of the laser active medium are produced compared to the duration of the pumping pulses. The use of the third partial bundle which impinges on the range of the distributed feedback either entirely or partially or not at all, what depends on how the two ranges are displaced relative to one another as well as by additionally controling the energy in the two first partial bundles relative to that in the third partial bundle, it is feasible to control the density of the photon flux. Since the light pulses produced pass the second range which either directly participates in the laser action or operates as an amplifier, the entire energy of the pumping radiation contributes to the energy of the radiation emitted from the laser active medium.

The entire pumping radiation is directly involved in the generation of the laser radiation provided that the third partial bundle entirely impinges upon the range of the distributed feedback. When the third partial bundle radiates the range adjoining the range of the distributed feedback the DFBL pulses are enhanced. Intermediate stages are obtained when the range of the third partial beam and of the lasing range partially overlap. The solution according to the invention permits the generation of very short light pulses by control of the density of the photon flux in the lasing range. The pulse duration and the frequency of the very short light pulses are tunable and their energy is only limited by the destruction threshold of the active medium due to the subsequent amplification involved. The frequency tuning is carried out in the manner already known for DFBDL.

BRIEF FIGURE DESCRIPTION

Figure 2:
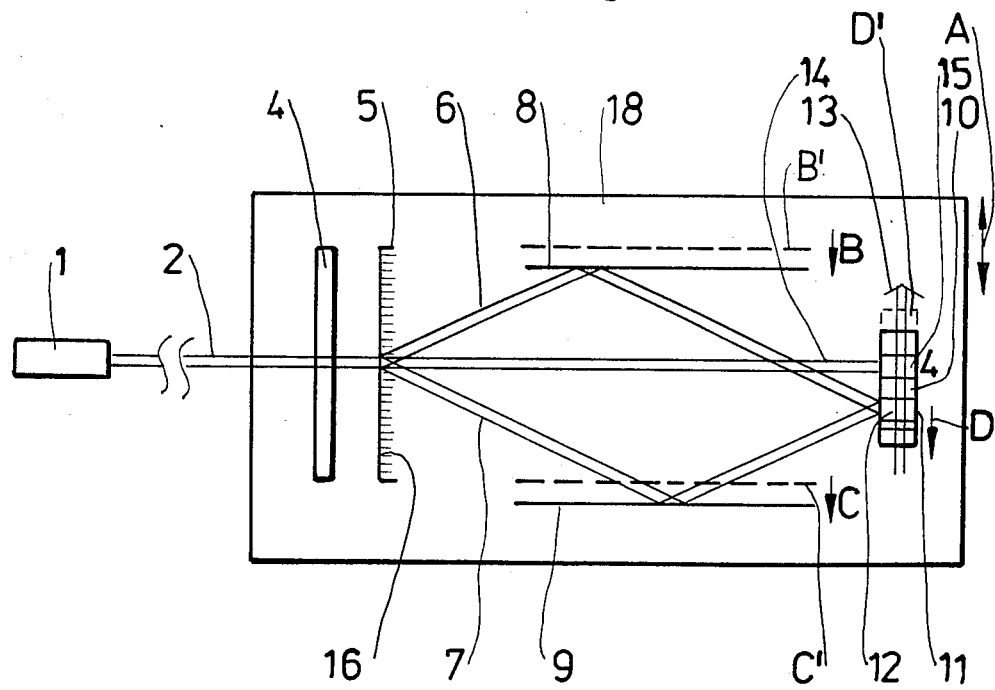

In order that the invention may be more readily understood reference is made to the accompanying drawings which illustrate diagrammatically and by way of example two embodiments thereof and where FIG. 1 is a schematic view of an arrangement according to the invention having a plano-parallel plate for beam displacement, FIG. 2 is a schematic view of an arrangement according to the invention with a common displacement of the components relative to the excitation beam.

DETAILED DISCLOSURE OF THE INVENTION

In FIG. 1 an excitation radiation source, namely a pulsed laser 1, is followed along an emitted substantially coherent bundle of beams 2 by a plano-parallel plate 3, a cylindrical lens 4 and a holographic grating 5.

In the partial bundles 6, 7 produced by the grating 5 which are, in the present example, beams of the $\pm 1^{st}$ order, deviating reflectors 8, 9 are arranged which fuse the two partial bundles 6, 7 in a laser active medium 10 contained in a cell 11. In a superimposition range 12 of the laser active medium 10 which is the range of the distributed feedback an interference pattern is generated by superimposition of the two partial bundles 6 and 7. At right angles to the planes of this interference pattern laser pulses 13 are emitted from the laser active medium 10.

The laser pulses 13 which are intended for further utilization pass a range 15 of the cell 11, onto which a partial bundle 14 of the zero order originating from the grating 5 is directed. A variation of the density of the photon flux in the range of the distributed feedback 12 which permits affecting the parameters of energy, halfwidth and structure of the laser pulses 13 generated is carried out in the manner described hereinafter.

By rotation of the planoparallel plate 3 about an axis of rotation 17 which is parallel to the grating 16 lines, the beam 2 is displaced parallel to itself so that the locus for generation of the partial bundles 6, 7, and 14 is displaced on the grating 5. Accordingly, the locus of impingement of the superimposing beams 6 and 9 in the cell 11, precisely in the range 12, is displaced relative to the locus of impingement of the partial bundle 14 in the range 15. Furthermore, and in order to vary the energies contained in the partial bundles 6, 7 and 14 the grating 5 is of varying contrast in parallel to the grating line direction. To this end the grating 5 is displaced in direction of the grating lines relative to the bundle of radiation 2 by not shown means.

In FIG. 2 the cylinder lens 4, the grating 5, the deviating reflectors 8, 9 and the laser medium 10 contained in the cell 11 are arranged on a common mount 18 which is displaceable in directions perpendicular to the propagation direction of the bundle of beams 2 indicated by a double arrow A. By displacement of the mount 18 in the directions indicated by the double arrow A a mutual displacement of the ranges 12 and 15 is obtained, which is the same effect as obtained by rotating the plate 3 in FIG. 1. Alternatively, it is feasible to arrange the deviating reflectors 8, 9 and the cell 11 on the common mount 18 which is indicated by the arrows B, C and D and the dashed lines B', C' and D'.

We claim:

1. A method for producing ultrashort light pulses comprising the steps of
   generating a substantially coherent bundle of pumping radiation,
   manipulating said pumping radiation to form a first, a second and a third partial bundle of radiation from said bundle of radiation,
   directing said first and said second partial bundle into a first range of a laser active medium for superposition and interference pattern generation therein, and subsequent laser beam formation, in the range of interference pattern generation, and
   directing said third partial bundle into the laser active medium for varying the density of photon flux in said third partial bundle of radiation.

2. A method for producing ultrashort light pulses as claimed in claim 1, wherein said step of directing said third partial bundle comprises directing said third partial bundle upon a second range of said laser active medium whereby the laser beam formed in said first range passes through said second range,
   said first and said second range being mutually displaced for varying the density of the photon flux of said pumping radiation, the mutual locations of said first and said second range being from entirely overlapping to not at all overlapping.

3. Method as claimed in claim 2, further comprising varying the energy in said first two partial bundles relative to the energy in said third partial bundle for varying the density of the photon flux.

4. Device for producing ultrashort light pulses comprising
   a pumping radiation source for emitting a substantially coherent bundle of radiation,
   means for focusing said coherent bundle of radiation and for producing therefrom first, second and third partial bundles of coherent radiation, first deviating means,
second deviating means,
a laser active material,
    said first deviating means and said second deviating means being arranged to direct said first partial bundle and said second partial bundle, respectively, for superimposition of said first and said second partial bundle and for interference pattern formation in a first range of said laser active medium for producing laser radiation therein,
    means for directing said third partial bundle upon a second range in said laser active medium through which said laser radiation passes
    means for mutually displacing said first and said second ranges, and means for adjusting the energy of said first two partial bundles with respect to the energy in said third partial bundle.

5. A device as claimed in claim 4, wherein said third partial bundle is the zero order of a grating and said first two partial bundles are the two first orders of said grating.

6. A device as claimed in claim 5, wherein said means for adjusting the energy in said first two partial bundles relative to the energy in said third partial bundle comprises a varying contrast of said grating parallel to the direction of said grating lines and wherein said grating is displaceable along the grating line direction with respect to said bundle of coherent radiation.

7. A device as claimed in claim 6, comprising a tiltable plano-parallel plate arranged between said pumping radiation source and said means for focusing said coherent bundle of radiation, the tilting axis of said plano-parallel plate being parallel to the direction of said grating lines, said plano-parallel plate serving to mutually displace said first range and said second range.

8. A device as claimed in claim 5, comprising a common mounting, said means for focusing, said grating, said first and said second deviating means and said laser active medium being secured to said common mounting for mutually displacing said first and said second range, said mounting being displaceable at right angles to the propagation direction of said coherent bundle of radiation and at right angles to the grating line direction.

9. A device as claimed in claim 6, further comprising a common mounting, said means for focusing, said grating, said first and said second deviating means and said laser active medium being secured to said common mounting for mutually displacing said first and said second range, said mounting being displaceable at right angles to the propagation direction of said coherent bundle of radiation and at right angles to the grating line direction.

10. A device as claimed in claim 5, further comprising a common mounting, said first and said second deviating means and said laser active medium being secured to said common mounting for mutually displacing said first range relative to said second range, said common mounting being displaceable at right angles to the propagation direction of said coherent bundle of radiation and at right angles to said grating line direction.

11. A device as claimed in claim 6, further comprising a common mounting, said first and said second deviating means and said laser active medium being secured to said common mounting for mutually displacing said first range relative to said second range, said common mounting being displaceable at right angles to the propagation direction of said coherent bundle of radiation and at right angles to said grating line direction.

* * * * *